United States Patent [19]

Piai

[11] Patent Number: 4,989,992
[45] Date of Patent: Feb. 5, 1991

[54] DEVICE FOR MEASURING THE TEMPERATURE OF THE MATERIAL CONTAINED IN A CLOSED APPARATUS

[75] Inventor: Bruno Piai, Castellanza, Italy
[73] Assignee: Pomini Farrel S.p.A., Castellanza, Italy
[21] Appl. No.: 377,630
[22] Filed: Jul. 7, 1989
[30] Foreign Application Priority Data
Jul. 29, 1988 [IT] Italy ............................. 21573 A/88
[51] Int. Cl.$^5$ .................. G01K 7/02; H01H 37/08; B29C 47/92
[52] U.S. Cl. .................. 374/141; 307/117; 374/179; 374/208; 425/170
[58] Field of Search .............. 374/179, 182, 163, 208; 307/117

[56] References Cited
U.S. PATENT DOCUMENTS

| | | | |
|---|---|---|---|
| 3,282,107 | 11/1966 | Ekstrom, Jr. ........................ | 374/133 |
| 3,580,078 | 5/1971 | MacKenzie ...................... | 374/179 X |
| 3,713,339 | 1/1973 | Medlar ............................ | 374/141 X |
| 3,843,290 | 10/1974 | Sender ............................ | 374/141 X |
| 4,423,968 | 1/1984 | Nemcek, Sr. et al. ............. | 374/170 |
| 4,470,710 | 9/1984 | Crane et al. ........................ | 374/127 |
| 4,627,745 | 12/1986 | Rider ................................ | 374/183 |
| 4,721,534 | 1/1988 | Phillippi .......................... | 374/179 X |

Primary Examiner—Daniel M. Yasich
Attorney, Agent, or Firm—Herbert Dubno

[57] ABSTRACT

Device for measuring the temperature of the material contained in a closed apparatus. Including a probe equipped with a sensitive thermocouple element mounted in a protective housing made of an electrically and thermally insulating material in contact with the material to be measured, the element is connected with a preamplification electronic circuit adjacent to it, and having an operational preamplifier connected with a couple of semiconductor switches and an integration circuit which probe is connected to means located at a distance from the apparatus for amplifying and processing the signal and associated with visualization, recording and control members.

12 Claims, 3 Drawing Sheets

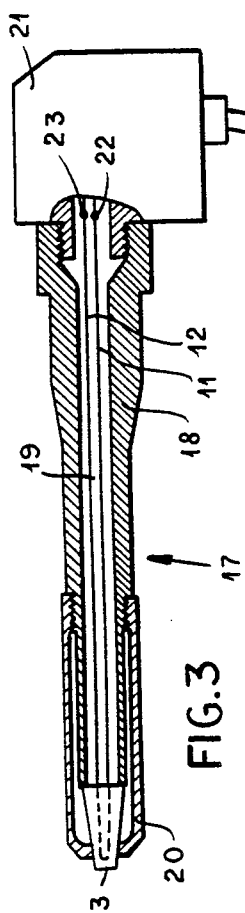
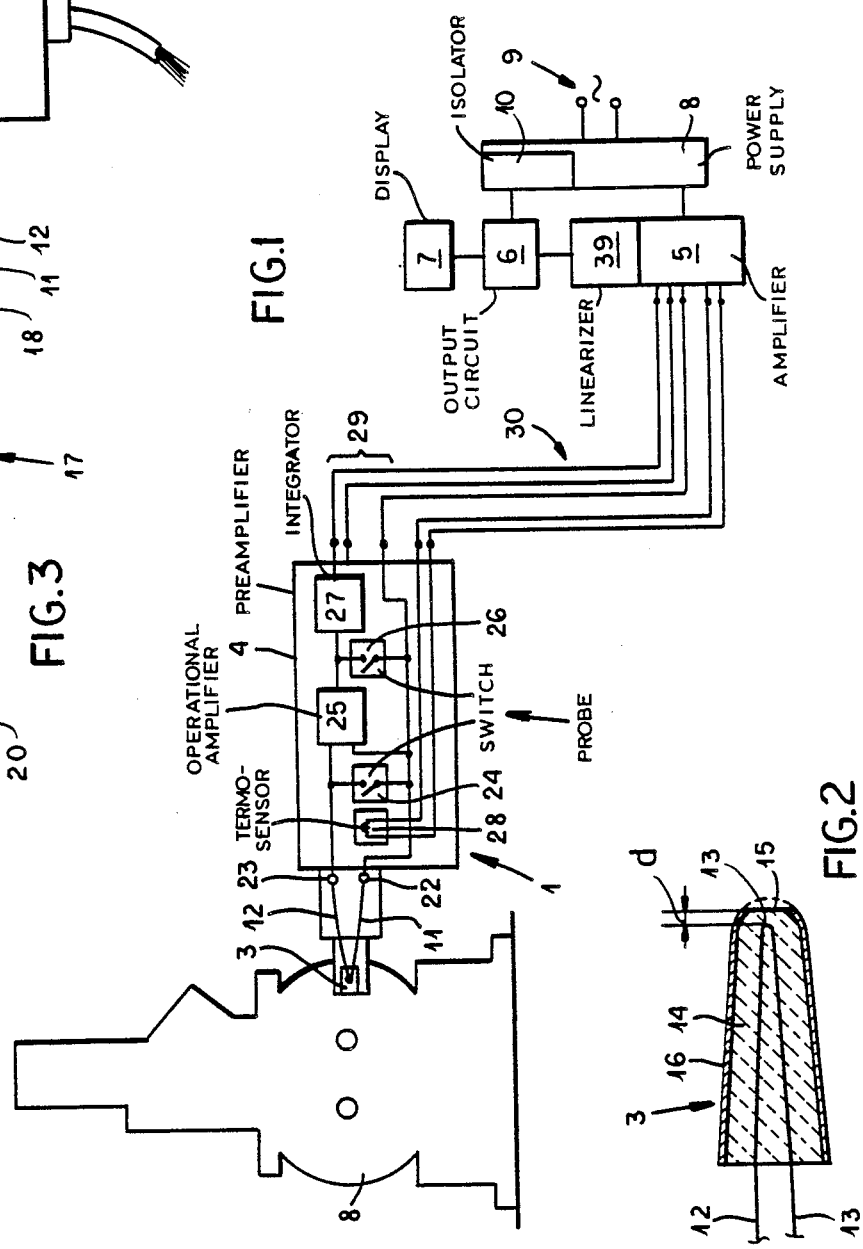

DEVICE FOR MEASURING THE TEMPERATURE OF THE MATERIAL CONTAINED IN A CLOSED APPARATUS

FIELD OF THE INVENTION

The present invention relates to a device for measuring the temperature of material contained in a closed apparatus and, more particularly, for measuring the temperature of the material contained in an internal mixer for rubbers, elastomers, polymers and similar materials.

BACKGROUND OF THE INVENTION

In many industrial processes, the monitoring and control of the temperature of the materials processed is of great importance and, for this purpose, it is necessary to measure with accuracy the value of the temperature of such materials, directly inside the machine in which the processing takes place.

A typical case of such a requirement is represented by an internal mixer for rubbers, polymers and similar materials, in which the temperature resulting from the internal friction during mixing or blending, must be controlled in order to avoid undesirable modifications to said materials.

Such temperature measurements may be carried out with electrical transducers, in particular by means of thermocouples, composed of different metals connected together at their ends; one of the connections, known as the hot junction, is then placed in contact with the material whose temperature is to be measured, and the other connection, known as the cold junction of the thermocouple, is located at a different, known temperature. Under these conditions, a voltage is produced between the two metals, which voltage may be detected and, suitably amplified, constitutes the indication of the temperature of the environment to be measured.

An apparatus of this type, however, has proved to be not very well suited for operation in industrial environments and, in particular, in such mixers with sufficient accuracy because, although they may be of sufficient sensitivity, the electrical signals supplied by the thermoelectrical effect are of extremely small value and are influenced by the perturbations created by electrical components present in the vicinity, which have values higher than that of the useful signal.

Furthermore, it must be possible to transmit the indication of temperature from the machine at which it is picked up to a control board, for example at a distance of several meters. For this purpose the signal must be amplified without, however, involving an amplification also of the perturbing signals, which would render the useful signal indistinguishable.

OBJECTS OF THE INVENTION

It is, therefore, an object of the invention to provide an apparatus which can detect the temperature of the material inside a machine without being influenced by the electrical perturbations of the environment.

A further problem which arises in the use of thermocouples is caused by the cold junction of said thermocouple, which must remain at a defined and measurable temperature, such that welds of other components of the circuit, at different temperatures will not alter its output to create spurious signals.

The use of thermocouple sensors, moreover, in particular in the case of rubber mixers or blenders, an intimate contact between the sensor member and the material, without unacceptable mechanical loading of the sensor, such as would prejudice its integrity.

It is also a object to provide a device for measuring the temperature of material inside a closed apparatus, which can ensure, even in very difficult environments, the required accuracy and which, moreover, shall comprise a sensor member having high mechanical characteristics adapted for assuring its strength even in the presence of considerable stresses resulting from the processing of the material to be measured.

SUMMARY OF THE INVENTION

These objects are attained by the present invention, which provides a device for measuring the temperature of the material contained in a closed apparatus, which comprises a probe equipped with a sensitive thermocouple element in contact with the material to be measured, the element being connected to a preamplification electronic circuit adjacent to it, which probe is connected to means, located at a distance, for amplifying and processing the signal, these means being associated with display, recording and control members.

In particular, the probe comprises a sensitive element constituted of two wires of metals having different thermoelectrical characteristics, connected to each other at one end by a weld, the wires being embedded in a protective covering envelope of electrically and thermally insulating ceramic material, the weld between the wires being at a very short distance from the front surface of the envelope.

Preferably, the wires of the sensitive element are constituted, respectively, of platinum and of platinum-rhodium, with ends welded together to form the hot junction of the thermoelectric couple.

The electrically and thermally insulating ceramic material constituting the envelope containing the wires of the thermocouple is preferably composed of a composition containing from 60 to 70% of zirconium oxide and from 20 to 30% of alumina, having a coefficient of thermal expansion close to that of the metal wires forming the thermocouple.

The weld of the junction between the wires is set back from the front surface of the envelope of ceramic material by a depth of between 10Å and 1 mm, and preferably between 1/100 and 5/10 of a millimeter.

The covering envelope for the wires of ceramic material is machined on its front face to a predetermined measurement, corresponding to the intended distance of the weld between the metal wires from said surface.

As an alternative, the covering envelope for the wires of ceramic material may be formed to the desired dimension by a dry molding technique.

With advantage, the ceramic covering envelope of the wires is provided with a covering surface layer of silica-based, medium-melting glass, adapted for providing reduced friction to the moving material in contact with it.

The connections constituting the cold junction in the electronic preamplification circuit are grouped in an area of reduced dimensions, inside which there is present a maximum thermal gradient compatible with the accuracy of measurement desired. Within this area there is also present a temperature sensor.

The electronic preamplification circuit is a switching amplifier circuit, which comprises respective connections for the free heads of the metal wires, welded together at their opposite ends and forming the thermocouple, from which connections there depart separate lines, connected together by a first controlled switch, which lead to the input of an operational amplifier, the output of which is provided with a second controlled switch connected to the zero reference of an integration circuit for the amplified signal.

The controlled switches are semiconductor switches governed by a slow-front square-wave pulse generator at a frequency lying within the range of optimum functioning of the operational amplifier.

The first switch is governed by a signal forming ascending and descending inclines of a slope such as to determine switching-over of the switch after the decay in the circuit of the spurious voltage peaks produced by switching.

Preferably, for the purpose of containing the dimensions of the assembly and, in consequence, the thermal gradients inside it, the preamplification circuit is constructed by hybrid technique, on a heat-conducting ceramic support.

The integration circuit for the signal is a low-pass filter and, in conjunction with the second switch connected to the zero reference, it constitutes a restoration circuit for the component in baseband of the signal.

The remotely situated means for amplifying and converting the signal, associated with the display, recording and control members, comprise an amplifier for the signal generated by the preamplification circuit, a linearizing circuit and an output separator circuit, supplied with galvanic isolation, the signal of which, variable within a predetermined range as a function of the temperature measured, is despatched to the visualization, recording and control members.

BRIEF DESCRIPTION OF THE DRAWING

The above and other objects, features and advantages of my invention will become more readily apparent from the following description, reference being made to the accompanying highly diagrammatic drawing in which:

FIG. 1 is a black diagram of the circuit for detecting and amplifying the temperature inside a mixer;

FIG. 2 is an enlarged section of the element carrying the hot junction;

FIG. 3 is a sectional view of a thermal probe according to this invention seating the hot joint and connected to the preamplification circuit;

SPECIFIC DESCRIPTION

Figure 4:
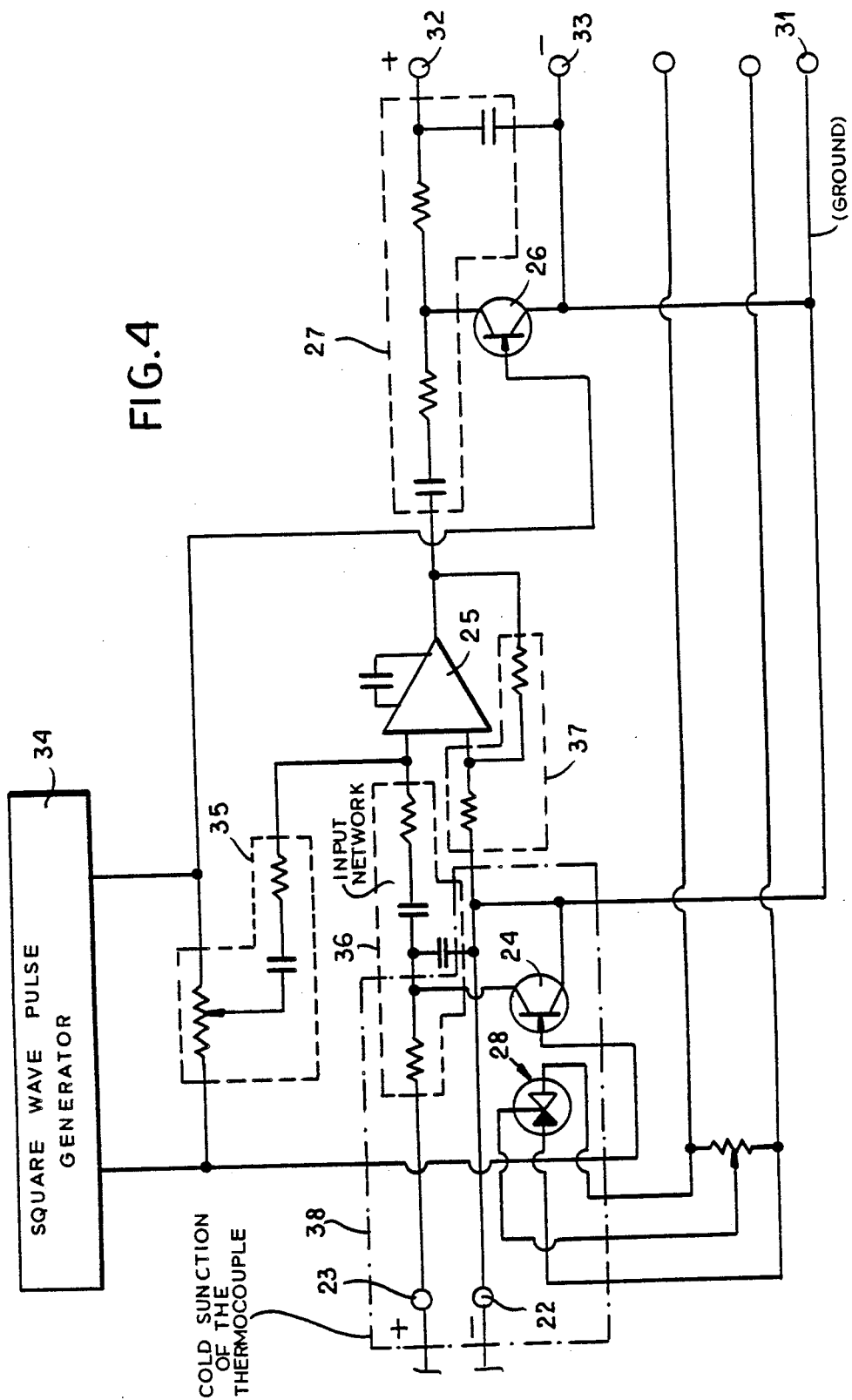
FIG. 4 is a circuit diagram of the preamplification circuit for the measuring signal.

FIG. 1 shows a device for measuring the temperature of the material contained in a closed apparatus, intended in particular for the thermal control in an internal mixer for rubbers, polymers and the like, which comprises a probe 1, having an end inserted into the apparatus 2 shown schematically. The probe is equipped with a sensitive thermocouple element 3, in contact with the material to be measured, the element being connected to a preamplification electronic circuit 4. The probe 1 is then connected to an amplification and linearization circuit 5 and, from this, to an output circuit 6, the signal from which is fed to a display or recorder 7 or to other members for display and control.

The circuits are supplied from a power supply unit 8, connected to the electrical mains 9 and having an isolator 10 to prevent transmission of perturbations to the indication and recording devices.

As is conventional, the power supply 8 which can supply the amplifier 5 and the linearizer 39 at the location remote from the probe can also supply the output circuit 6, matching the amplifier 5 with the display 7 through an isolator circuit to prevent the aforementioned transmission of power supply perturbations to the display.

The sensitive element 3 of the probe 1 is illustrated in FIG. 2 and comprises two wires 11, 12 of different materials, such as, for example, platinum and platinum-rhodium, connected together by a joint 13 constituting the hot junction of the thermocouple. The junction is housed inside an envelope of ceramic material 14 providing support and thermal and electrical insulation for the junction.

As FIG. 2 shows, the junction 13 is situated at the end of the covering 16, embedded at a short distance from its end surface 15, for the purpose of ensuring that the temperature of the junction 13 shall as far as possible be equal to that of the material to be measured.

The embedding distance d of the junction 13 beneath the front surface of the covering 16 must, therefore, be kept very small, without however exposing the junction itself to dangerous mechanical stress.

With advantage the value d, according to the accuracy desired, may in general lie between 10Å and 1 mm and, for the more common applications a value of d may be used lying between 1/100 and 5/10 of a millimeter.

For the construction of the covering 16, there is used a ceramic material, for which properties of low thermal capacity and low thermal conductivity are demanded, so that the junction may be kept insulated from the temperature of the walls of the machine, which usually is different from the temperature of the contained material, and may rapidly follow the oscillations in temperature of said material.

The covering 16 must, in addition, possess high chemical and mechanical resistance, since it must operate in direct contact with the material being mixed. Furthermore this ceramic material must provide a solid anchorage for the wires covered by it, with a coefficient of thermal expansion close to that of the wires themselves so that internal stresses shall not be created with them even when rapid temperature excursions occur.

The mechanical strength required will vary with the application intended; in the case of mixers for rubber and polymers, it is advantageous for the ceramic material to have a bending strength greater than 16 kg/mm$^2$.

The material of the covering is formed, preferably, by casting in a mold and sintering. An appropriate composition, in combination with wires of platinum and platinum-rhodium forming the junction 13, is constituted for example of a mixture of alumina and zirconium oxide, containing approximately 65% of zirconium oxide and 25% of alumina.

The covering is formed by pouring the material in the fluid state into a mould, in which there are placed the wires 11, 12, connected together by the junction 13 and held in position by a shaped support; the profile of the mould is such, as illustrated in FIG. 2, as to provide a rough element having a length greater than the final length; the part extending beyond the desired value, shown in broken line, corresponding to the aforementioned embedding distance "d" for the junction, is ground after sintering, thus assuring the accuracy of said dimension "d".

The technique described is appropriate for the production of a limited number of pieces; for larger production runs, for example above 2,000 pieces, different production techniques are economically advantageous, such as dry moulding, which make possible the achieving of the aforementioned dimensional accuracy characteristics without repetition of machining.

A covering of silica-based, medium-melting glass, having a coefficient of expansion similar to that of the ceramic, with a thickness appropriately comprised between 10 and 50 μm, applied after the sintering of the ceramic, improves the sliding characteristics of the material to be measured over the sensitive element, in particular in the case of rubber, thereby preventing localized overheating of the sensitive element itself by friction, which would render inaccurate the temperature measurement carried out.

The sensitive element 3 of the probe 1 is seated at the end of a tubular support 17 which can be passed through the wall of the mixer 2 providing support and protection to the element 3; as illustrated in FIG. 3, the tubular support 17 comprises a substantially cylindrical portion 18, provided with an axial hole 19, at the end of which there is situated the sensitive element 3, clamped by an end cap 20, from which it projects by a small amount.

At the opposite end, on the exterior of the mixer, a box 21 is attached to the tubular support 17, this box containing the preamplification circuit 4, to which the wires 11, 12 of the sensitive element 3 are connected via the connections 22, 23. The preamplification circuit has the purpose of amplifying the signal supplied by the thermocouple, which is of the order of a few microvolt, transforming it into a signal in the millivolt range, which can then be supplied to a control board of the apparatus located at a distance of some meters, as indicated diagrammatically in FIG. 1; the control board houses the amplifier and the linearizer, which raises and linearizes the signal according to the appropriate standards for governing the display, recording and regulating members provided.

The preamplification circuit, operating at a short distance from the motor of the mixer 2, must be shielded from the electrical perturbations produced by the motor.

As FIG. 1 shows, the preamplification circuit 4 comprises a first controlled switch 24, an operational amplifier 25, a second controlled switch 26 and an integration circuit 27 for the amplified signal.

The circuit 4 comprises, in addition, a thermal sensor 28, adapted for detecting the temperature of the connections which form, inside the circuit 4, the cold junction of the thermocouple.

To the output connections 29 of the preamplification circuit 4 there are connected the remote connection lines 30 to the amplifier 5.

In greater detail, as illustrated in FIG. 4, the preamplification circuit 4 comprises the connections 22, 23 of the wires 11 and 12, respectively negative and positive; the negative one of them, 22 in the Figure, is connected to the zero reference or ground 31.

The connections 22, 23 are then connected to one another by the first controlled switch 24, of semiconductor type, and then pass to the input of an operational amplifier 25; the output from the amplifier 25 is then supplied to the integrator circuit 27 and, from this, to the output side 32, marked +, and is also connected to the side 33, marked −, and to the zero reference or ground 31 by the second controlled switch 26, also of semiconductor type.

The switches 24, 26 are controlled by a square-wave pulse generator 34.

The preamplification circuit furthermore comprises a zero-setting circuit 35, an input network 36 to the operational amplifier, and a negative feedback network 37, determining the gain of the amplifier.

The input connections 22, 23 of the wires 11, 12, the switch 24 and its connections and everything contained in the area 38, indicated in the Figure by dot-and-dash line, constitute as a whole the cold junction of the thermocouple, the temperature of which must be measured with accuracy in order to determine the actual temperature of the hot junction.

The accuracy of the measurement carried out is conditional upon the maintenance of all the metal pairs constituting the cold junction at the same temperature, in order to avoid the formation of spurious thermocouples; with this objective, the connections present are reduced to the minimum and the area 38, inside which the thermistor constituting the thermal sensor 28 is situated, is of the smallest possible dimensions, in respect both of the technique of construction of the circuit and of its thermal conduction characteristics.

An appropriate technique for the construction of the preamplification circuit, from the point of view of repetitive production, consists of a hybrid technique, with a substrate of heat-conducting ceramic, which also enables the overall dimension of the circuit to be kept small, thus assuring in a satisfactory manner the equality of temperature of the welds constituting the cold junction, with a thermal difference not exceeding 1° to 1.5° C.

The hybrid technique reduces to a minimum the use of conductors having thermoelectric characteristics different from those of the platinum/platinum-rhodium pair, which avoids the introduction of spurious thermocouples resulting from the presence of other connections of different metals.

At the input connections 22, 23 of the preamplification circuit, there is present a signal composed of the voltage produced by the thermoelectric effect of the junction 13, at a temperature different from that of the cold junction 38, affected by perturbations resulting from numerous causes, such as the electric motor of the mixer and its operating devices, other electrical devices present in the vicinity, and also caused by the amplification circuits for the signal themselves.

For the purpose of making possible the transmission to a certain distance of the signal corresponding to variations in temperature of the measurement environment, the signal itself is amplified, eliminating the spurious values present.

Figure 5:
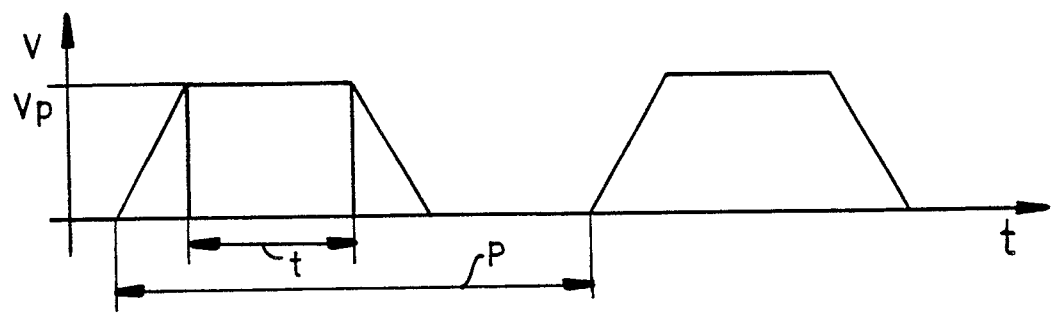
FIG. 5 is a waveform diagram of the governing signal for the first switch.

For this purpose, the switch 24 is controlled by the square-wave pulse generator 34 with a signal of the type shown in FIG. 5, periodic with period p; the mark time t at maximum value $V_p$ corresponds to the closing of the switch 24, short-circuiting the input connections 22, 23; the ascending and descending flanks at maximum value advantageously have a duration of between 1/10 and 1/100 t.

The closure of the switch 24 periodically brings to zero the voltage at the poles 22, 23, and the object of this is periodically to supply the zero reference level for the input signal to the amplifier 25, thereby avoiding drift with time.

The period is that for which the amplifier 25 operates in the frequency range most suitable for it with respect to noise and stability.

Figure 6:
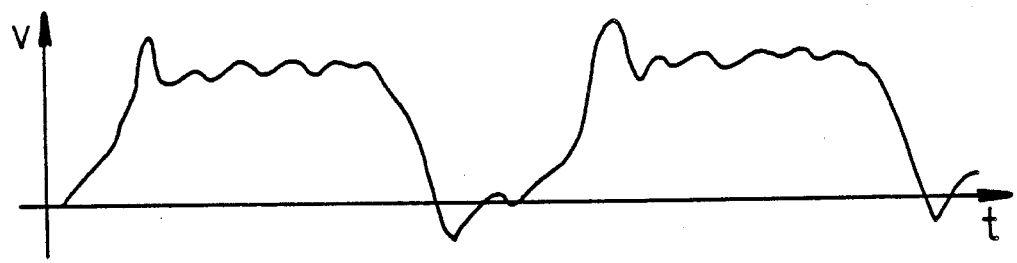
FIG. 6 is a waveform diagram of the input signal to the amplifier with control by steep slopes.

In the presence of ascending and descending flanks at the maximum value of the governing signal $V_p$ of excessively steep slope, the input signal to the amplifier 25 would be of the type shown in FIG. 6, with peaks and oscillations of high amplitude, which would reach values even of one order of magnitude greater than that of the useful signal and of an energy that would be difficult to control.

Figure 7:
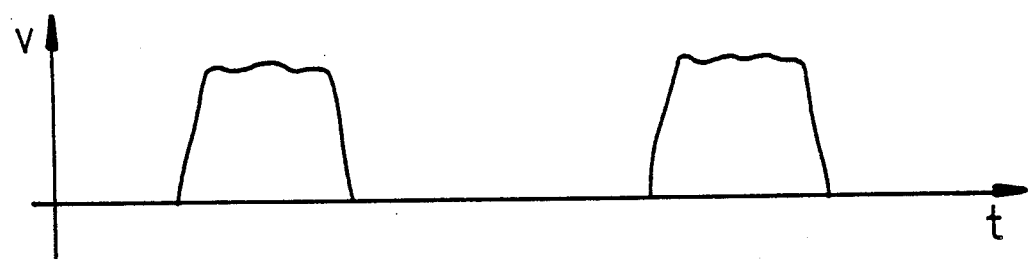
FIG. 7 is a waveform diagram of the input signal to the amplifier with governing by moderate slopes.

The presence of a flank of reduced slope, in respect of the characteristics of the switch 24, has the effect that, as illustrated in FIG. 7, the voltage pulses resulting from the controlling of the switch decay before the switch 24 effectively switches over.

Figure 8:
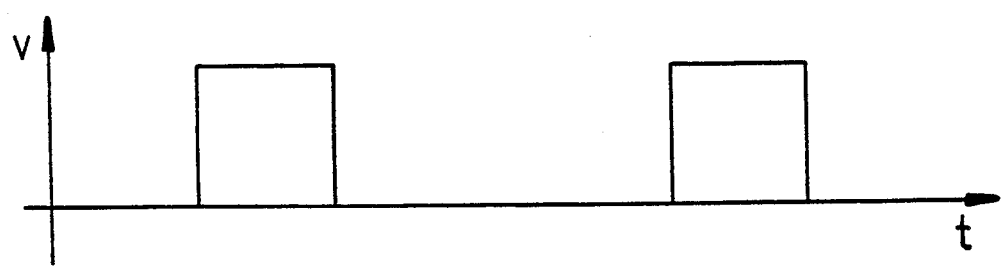
FIG. 8 is a waveform diagram of the governing signal for the first switch.

The signal amplified by the operational amplifier 25 is therefore periodically brought to zero by the switch 26, triggered in phase with the switch 24 with a signal of the type indicated in FIG. 8 and is then supplied to the integrating circuit 27, constituted of a low-pass filter, which permits the passage of the baseband component of the signal, constituting its significant part for the purposes of measurement.

The restoration of the zero carried out by the switch 26 eliminates the drifts which could be produced in the amplifier.

The output signal from the preamplifier 4 possesses an intensity of several millivolt, sufficient to be fed without significant modifications to the amplifier 5, of known type, situated at a distance of several metres, in an industrial environment, for example on the control panel of the mixer, where it is subsequently amplified and compared with the signal produced by the temperature sensor 28 of the cold junction.

The amplifier 5 generates a signal which is linearized by a linearizer circuit 39, itself also of known type, supplying at its output a signal proportional to the temperature of the material in contact with the sensor 3, which signal is then fed to the output circuit 6, receiving its current supply with electrical isolation, which converts the signal corresponding to the temperature measured into a variable signal in the governing range for the instrument or instruments 7 connected, such as indicators, recorders, processors and the like.

The linearizer circuit 39 and the preamplifier prove to be necessary, in particular, as a result of the use of a thermocouple of the platinum/platinum-rhodium type, which does not possess either a linear thermoelectric voltage or a linear response curve in the temperature range which is of interest for the applications to mixers for rubbers and polymers, lying normally between approximately 20° and 250° C.

Said materials, nevertheless, have been selected for the chemical-physical affinity with the ceramics possessed by them, which enable the characteristics of robustness and insulation of the probe necessary to the application to be achieved, as described above. The important values for the functioning of the circuits of this invention should be determined in relation to the type of components used, in particular with respect to the operational amplifier 25, and also on the basis of the production technique used for the circuits.

In operation, the thermocouple will detect the temperature of the material contacting the surface 15 of the envelope 14 and generate a potential at 13 which is initially amplified at 25, integrated at 27 and supplied to the amplifier 15 for display at 7.

I claim:

1. An apparatus for measuring the temperature of materials in a closed environment, comprising:
    a probe including
        an elongated housing having a first end adapted to contact said material and a second end remote from said first end,
        a thermocouple constituted of two wires of metals having different thermoelectric characteristics and connected together at one end to form a weld located at said first end, and
    an electrically and thermally insulating ceramic envelope receiving said wires and in which said weld is received at a short distance from a surface of said envelope at said first end in contact with said material, said envelope being constituted of a composition containing 60 to 70% zirconium oxide and 20 to 30% alumina and having a coefficient of thermal expansion close to that of said wires;
    an electronic preamplification circuit in a housing mounted on said second end of said probe, connected to said wires; and
    signal processing means remote from said probe and electrically connected to said preamplification circuit, said signal processing means including a remotely located amplifier and means for displaying an output from said probe.

2. The apparatus defined in claim 1 wherein said wires are composed of platinum and platinum-rhodium.

3. The apparatus defined in claim 1 wherein said weld is embedded in said ceramic envelope at a depth between 10 Angstroms and 1 millimeter from said surface of said envelope in contact with said material.

4. The apparatus defined in claim 3 wherein said depth is between 1/100 and 5/10 of a millimeter.

5. The apparatus defined in claim 4 wherein said surface of said envelope in contact with said material is a machined surface, machined to establish said depth.

6. The apparatus defined in claim 1 further comprising a covering layer of a silica-based medium-melting glass on said envelope at least in a region of said envelope in contact with said material.

7. The apparatus defined in claim 1 wherein said housing is provided with a compartment at said second end receiving said preamplification circuit, a cold junction of said thermocouple and a temperature sensor connected to said amplifier for measuring temperature of said cold junction.

8. The apparatus for measuring the temperature of materials in a closed environment, comprising:
    a probe including an elongated housing having a first end adapted to contact said material and a second end remote from said first end, and a thermocouple in said probe constituted of two wires of metals having different thermoelectric characteristics and connected together at one end to form a weld located at said first end of said housing and constituting a hot junction of said thermocouple, said wires forming a cool junction of said thermocouple at said second end;
    an electronic preamplification circuit in a housing mounted on said second end of said probe connected to said cold junction and including:

an operational amplifier having inputs connected to said wires, a first controlled switch bridged across said preamplification circuit ahead of said operational amplifier and across the inputs thereof, a second controlled switch bridged between an output of said operational amplifier and a ground conductor, and an integration circuit connected to said output of said operational amplifier; and signal processing means remote from said probe and electrically connected to said integrator, and said ground conductor, signal processing means including the amplifier remotely located and means for displaying an output from said probe.

9. The apparatus defined in claim 8 wherein said controlled switches are semiconductor switches, said preamplification circuit further comprising a square-wave pulse generator operatively connected to said controlled switches for operating same.

10. The apparatus defined in claim 9 further comprising means for applying to said first switch a signal forming ascending and descending flanks of a slope switching over said first switch upon decay of spurious voltage peaks produced by switching.

11. The apparatus defined in claim 8 wherein said integration circuit is a low pass filter.

12. The apparatus defined in claim 8 wherein said signal processing means includes a power supply for said amplifier and an isolator between said power supply and said means for displaying an output from said probe.

* * * * *